United States Patent
Sasaki et al.

(10) Patent No.: US 7,015,916 B2
(45) Date of Patent: Mar. 21, 2006

(54) DRAW PROCESSING DEVICE AND DRAWING METHOD FOR DRAWING IMAGE ON TWO-DIMENSIONAL SCREEN

(75) Inventors: Nobuo Sasaki, Kanagawa (JP); Shinya Wada, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 181 days.

(21) Appl. No.: 10/208,655

(22) Filed: Jul. 30, 2002

(65) Prior Publication Data

US 2003/0025700 A1 Feb. 6, 2003

(30) Foreign Application Priority Data

Aug. 3, 2001 (JP) ............................. 2001-236395

(51) Int. Cl.
*G09G 5/39* (2006.01)
(52) U.S. Cl. ..................... 345/531; 345/428; 345/552; 345/582; 345/553
(58) Field of Classification Search ................ 345/531, 345/552, 553, 522, 581–589, 428, 423, 558
See application file for complete search history.

(56) References Cited

U.S. PATENT DOCUMENTS

| 5,485,559 | A |   | 1/1996  | Sakaibara et al. |
| 5,973,701 | A | * | 10/1999 | Vaswani ...................... 345/587 |
| 6,002,407 | A | * | 12/1999 | Fadden ....................... 345/582 |
| 6,222,550 | B1 |   | 4/2001  | Rosman et al. |
| 6,392,655 | B1 | * | 5/2002  | Migdal et al. ............... 345/582 |
| 6,515,670 | B1 | * | 2/2003  | Huang et al. ................ 345/503 |
| 6,545,683 | B1 | * | 4/2003  | Williams ..................... 345/522 |

FOREIGN PATENT DOCUMENTS

| EP | 1 096 427   | 5/2001  |
| JP | 8-320946    | 12/1996 |
| JP | 9-231401    | 9/1997  |
| JP | 11-272881   | 10/1999 |
| JP | 2001-076174 | 3/2001  |
| JP | 2001-084390 | 3/2001  |

OTHER PUBLICATIONS

Awaga, et al., "3D Graphics Processor Chip Set" IEEE Micro, vol. 15, No. 6; Dec. 1995, pp. 37-45 XP000538229 ISSN: 0272-1732.

(Continued)

*Primary Examiner*—Matthew C. Bella
*Assistant Examiner*—Hau Nguyen
(74) *Attorney, Agent, or Firm*—Katten Muchin Rosenman LLP

(57) ABSTRACT

A modeling section and geometry processing section collectively generate draw data used for a series of draw processing, and a control section transfers the generated draw data to a multi-path buffer. The draw processing is executed, under control of the control section, when a multi-path controller serially reads out the draw data stored in the multi-path buffer and outputs them to a rendering engine. This successfully saves the band width necessary for transfer of the draw data from a main processor to a graphic processor, and relieve the main processor from the process load.

20 Claims, 6 Drawing Sheets

OTHER PUBLICATIONS

White, et al., "The Tayra 3-D Graphics Raster Processor" Computers and Graphics, Pergamon Press Ltd. vol. 21, No. 2; Mar. 1997: pp. 129-142, XP004064041; ISSN: 0097-8493.

Chou, et al., "Efficient Transmission of Triangle Meshes to Graphics Processors" IEEE, Oct. 11, 2000, pp. 275-284; XP010525237.

El Sana, et al., "Efficiently Computing and Updating Triangle Strips for Real-Time Rendering" Computer Aided Design, vol. 32, No. 13: Nov. 2000 pp. 753-772, XP004208347; ISSN: 0010-4485.

Notification of Reason(s) for Refusal dated Jul. 5, 2005.

* cited by examiner

FIG. 3

| NAME OF GEOMETRY DATA | CONTENT OF GEOMETRY DATA | | |
|---|---|---|---|
| ① (X, Y, Z) | ○○○○○○ | ○○○○○○ | ○○○○○○ |
| ② (S1, T1, Q1) | △△△△△△ | △△△△△△ | △△△△△△ |
| ③ (S2, T2, Q2) | ×××××× | ×××××× | ×××××× |
| ④ (R, G, B, A) | □□□□□□ | □□□□□□ | □□□□□□ |
| ⑤ (X, Y, Z) | ○○○○○○ | ○○○○○○ | ○○○○○○ |
| ⑥ (S1, T1, Q1) | △△△△△△ | △△△△△△ | △△△△△△ |
| ⑦ (S2, T2, Q2) | ×××××× | ×××××× | ×××××× |
| ⑧ (R, G, B, A) | □□□□□□ | □□□□□□ | □□□□□□ |
| ⑨ (X, Y, Z) | ○○○○○○ | ○○○○○○ | ○○○○○○ |
| ⑩ (S1, T1, Q1) | △△△△△△ | △△△△△△ | △△△△△△ |
| ⑪ (S2, T2, Q2) | ×××××× | ×××××× | ×××××× |
| ⑫ (R, G, B, A) | □□□□□□ | □□□□□□ | □□□□□□ |
| ⑬ DRAW | | | |
| ⑭ (X, Y, Z) | ○○○○○○ | ○○○○○○ | ○○○○○○ |
| ⑮ (S1, T1, Q1) | △△△△△△ | △△△△△△ | △△△△△△ |
| ⑯ (S2, T2, Q2) | ×××××× | ×××××× | ×××××× |
| -------- | □□□□□□ | □□□□□□ | □□□□□□ |
| | -------- | ○○○○○○ | ○○○○○○ |

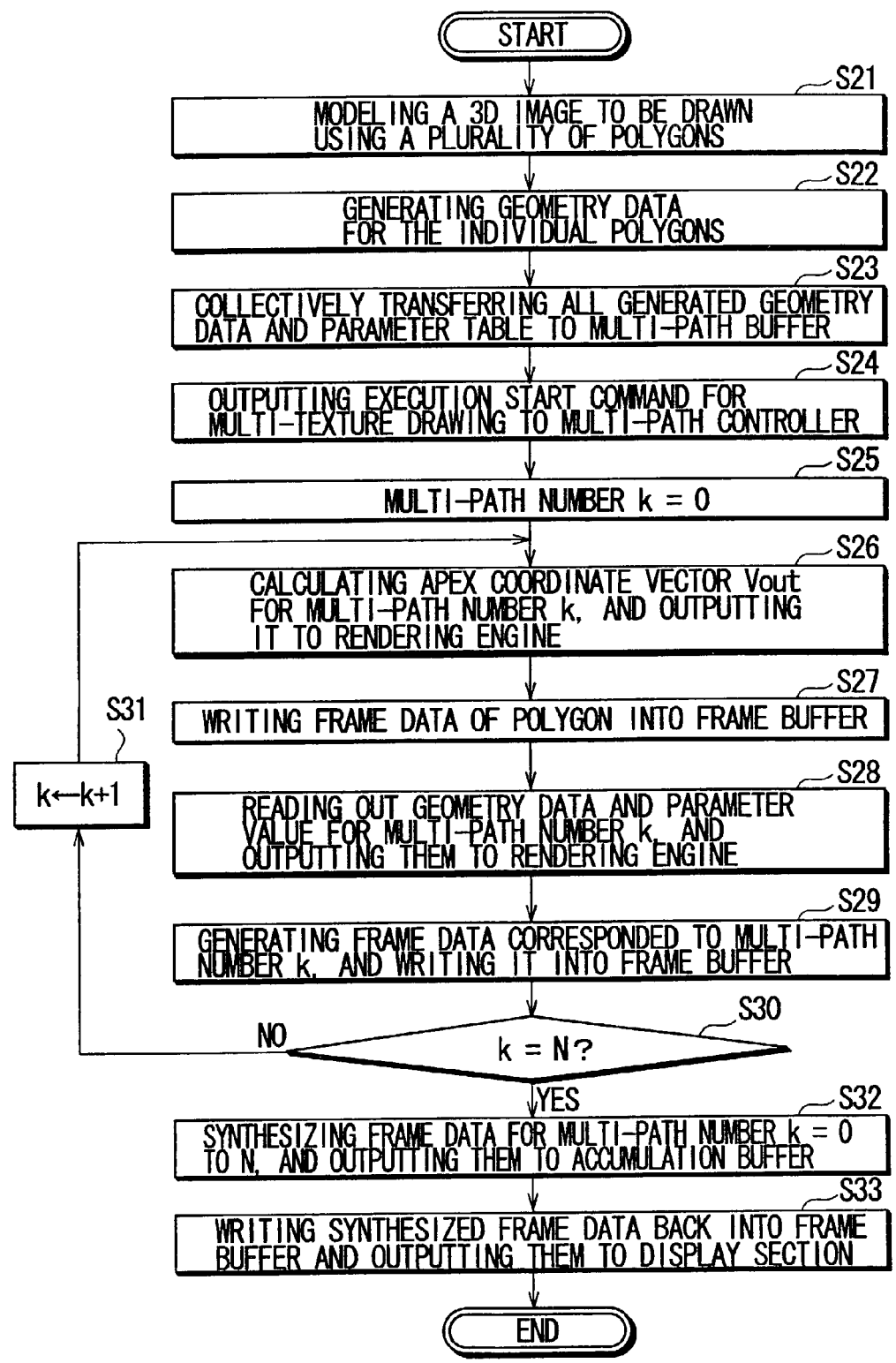

FIG. 6

| MULTI-PATH NUMBER k | BASE POINT FOR TEXTURE A | BASE POINT FOR TEXTURE B | BLENDING RATIO |
|---|---|---|---|
| 0 | 1024 | 1040 | 0.0000 |
| 1 | 1024 | 1040 | 0.3333 |
| 2 | 1024 | 1040 | 0.6666 |
| 3 | 1040 | 1056 | 0.0000 |
| 4 | 1040 | 1056 | 0.3333 |

DRAW PROCESSING DEVICE AND DRAWING METHOD FOR DRAWING IMAGE ON TWO-DIMENSIONAL SCREEN

This application is related to Japanese Patent Application No. 2001-236395 filed on Aug. 3, 2001 based on which this application claims priority under the Paris Convention and the contents of which are incorporated herein by reference.

BACKGROUND OF THE INVENTION

1. Field of the Invention

The present invention relates to a draw processing device, a drawing method, a draw program, and a computer-readable recording medium having recorded therein the draw program, all of which are aimed at drawing images on a two-dimensional screen of devices such as television monitor device.

2. Description of the Related Art

There are accelerated trends in higher integration and faster processing speed of processors and memories in recent television game consoles and personal computers, so that draw processing devices such as television game consoles and personal computers can generate three-dimensional images full of real presence, reality and perspective representation in a real-time manner, and can display them on a two-dimensional screen.

Another recent trend relates to a process in which the individual polygons composing a three-dimensional image to be drawn on a two-dimensional screen are subjected to rendering in a plurality of paths to thereby paste a plurality of textures (referred to as multi-path rendering hereinafter), which is advantageous for raising reality of the three-dimensional image drawn on the two-dimensional screen.

In a conventional draw processing device, a main processor of the device serially produces geometry data which comprises polygon apex coordinate data, texture coordinate data and brightness data, and then sends them to a graphic processor for executing draw processing using the geometry data. Therefore the main processor has to generate the geometry data containing the same apex coordinate data every time the individual rendering paths are executed, and has to serially send thus generated geometry data to the graphic processor. This was causative of an excessive load for the main processor of the conventional draw processing device in multi-path rendering.

For the case the multi-path rendering is executed for a plurality of polygons, the volume of geometry data transferred from the main processor to the graphic processor will be vast in proportion to both the number of polygons and the number of rendering paths, so that a large percentage of the band width of a bus wiring which connects the main processor and graphic processor is undesirably occupied only for the transfer of the geometry data, which considerably lowers the speed of data transfer from the main processor to graphic processor.

The same problem may also occur when a plurality of polygons having the same shape are subjected to rendering, or when a plurality of polygon planes having different texture blending ratios are synthesized, which process is generally referred to as multi-texture drawing.

More specifically, for the case that a plurality of polygons having an identical shape are to be drawn using an ordinary draw processing device, the main processor must generate geometry data for every polygon and must transfer thus generated geometry data to the graphic processor, which results in the same problem as described in the above.

As for multi-texture drawing, the main processor must generate geometry data together with base-point values and blending ratios for a plurality of textures used for the blend drawing onto the polygon planes for every polygon plane differing in the texture blending ratio, and must serially transfer thus generated data to the graphic processor, which again results in the same problem as described in the above.

SUMMARY OF THE INVENTION

The present invention was proposed to address the foregoing problems, and an object thereof resides in that providing a draw processing device, a drawing method, a draw program, and a computer-readable recording medium having recorded therein the draw program, all of which are aimed at attaining higher drawing speed by relieving the main processor from the process load and by saving the band-width necessary for transfer of the draw data from the main processor to the graphic processor.

According to the present invention, a draw data generating section collectively generates draw data used for a series of draw processing, and a control section transfers thus generated draw data to a multi-path buffer. The draw processing is executed, under control of the control section, when a multi-path controller serially reads out the draw data stored in the multi-path buffer and outputs them to a draw processing section.

With the constitution, it is no more necessary to serially transfer draw data from the main processor to graphic processor, so that the number of times of data transfer from the main processor to graphic processor can considerably be reduced, and the band-width necessary for the transfer of draw data from the main processor to graphic processor can considerably be saved. The main processor collectively generates all draw data used for a series of draw processing, and is responsible only for outputting control commands to thereby control the graphic processor during the execution draw processing, which contributes to reduction in process load for the main processor. This results in a dramatic improvement in the drawing speed of the draw processing device.

Other and further objects and features of the present invention will become obvious upon understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIG. 3 is a schematic drawing of a data arrangement in a multi-path buffer according to an embodiment of the present invention;

FIG. 4 is a flow chart of a multi-texture drawing according to an embodiment of the present invention;

FIG. 6 is a schematic drawing of a data arrangement in a parameter table according to an embodiment of the present invention.

DETAILED DESCRIPTION OF THE PREFERRED EMBODIMENTS

Figure 1:
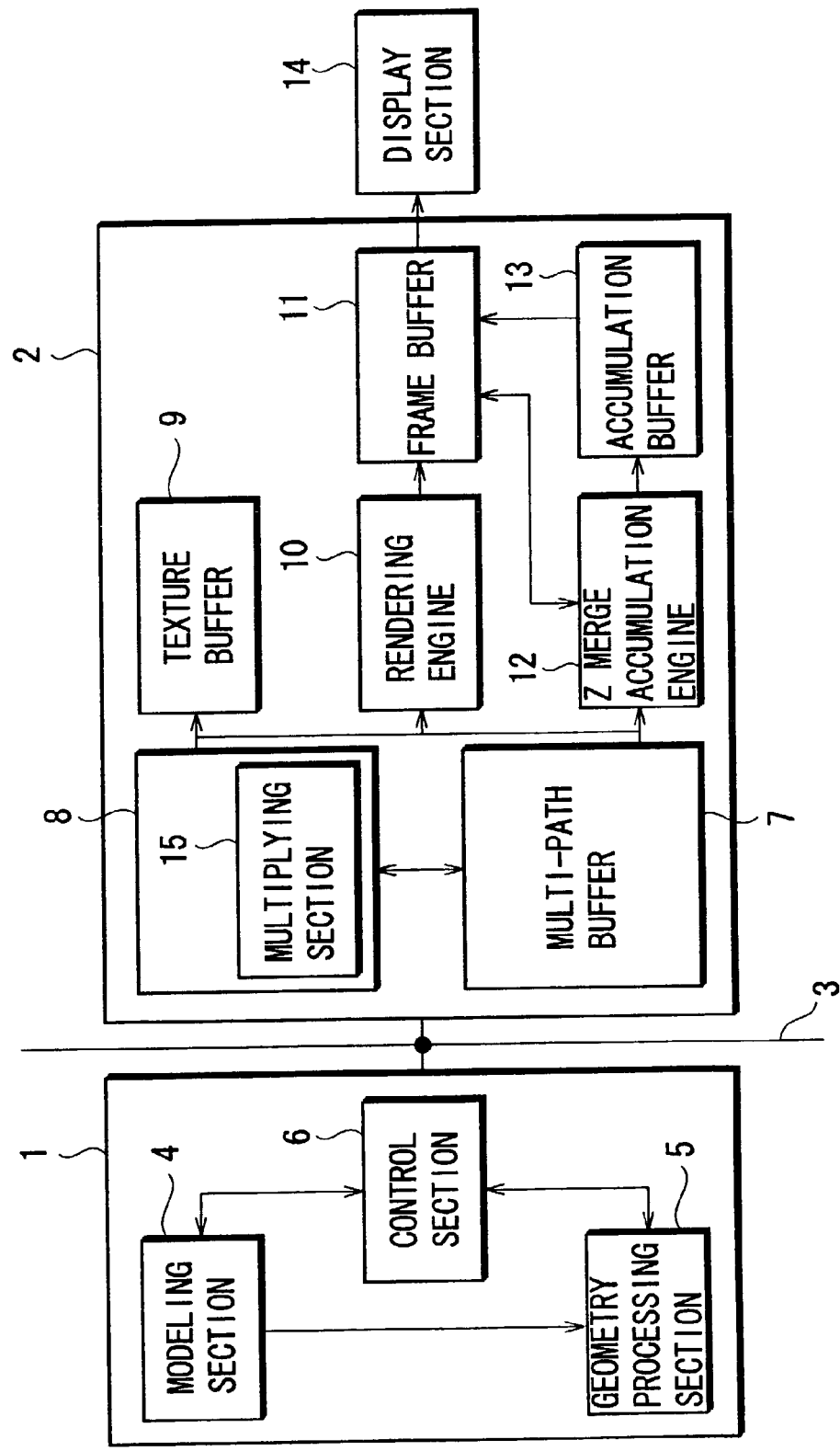
FIG. 1 is a block diagram showing a constitution of a draw processing device according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Constitution of Draw Processing Device

A constitution of a draw processing device according to an embodiment of the present invention will be explained referring to FIG. 1.

The draw processing device according to the embodiment of the present invention has, as principal components, a main processor 1 and a graphic processor 2. Both processors are electrically connected through a bus wiring 3.

Internal Constitution of Main Processor

The main processor 1 is a processor device capable of executing various processing including calculation, and comprises a modeling section 4, a geometry processing section 5 and a control section 6.

The modeling section 4 generates information related to polygons (referred to as "polygon information" hereinafter) which composes a three-dimensional image to be drawn on a two-dimensional screen, and outputs thus generated polygon information to the geometry processing section 5. The polygon information contains information related to apex coordinate values (x,y,z) of the individual polygons in an object coordinate system, normal line vector $R_{in}$ and displacement vector $N_{in}$ at the individual apexes.

The geometry processing section 5 executes so-called geometry processing (three-dimensional coordinate calculation) typically including coordinate conversion, clipping, transparent conversion, and light source calculation using the foregoing polygon information, and generates information (referred to as "geometry data" hereinafter) typically including apex coordinate data (X,Y,Z) of the individual polygons in the coordinate system on the two-dimensional screen, the texture coordinate data (S,T,Q) and brightness data (R,G,B,A) for the individual apexes. The values R, G, B and A of the brightness data (R,G,B,A) represent brightness values for red (R), green (G) and blue (B) at the apex, and a blending ratio (A) used in α-blending (semi-transparent processing), respectively.

The control section 6 is electrically connected to the modeling section 4 and geometry processing section 5 through an electric wiring, and controls operations of the modeling section 4 and geometry processing section 5 by outputting control signals. The control section 6 also transfers the geometry data generated by the geometry processing section 5 to a multi-path buffer 7 in the graphic processor 2, and outputs control signals and control data to a multi-path controller 8 in the graphic processor 2 to thereby control draw operation of the graphic processor 2 using the geometry data. For the case that multi-texture drawing is executed, the control section 6 transfers to the multi-path buffer 7 a parameter table having recorded therein information related to the base points and blending ratios of textures to be used in the drawing together with the geometry data.

In summary, the main processor 1 is composed so as to (1) execute modeling and geometry processing to thereby generate geometry data for a three-dimensional image to be drawn on a two-dimensional screen; (2) transfer thus generated geometry data to the multi-path buffer 7 in the graphic processor 2; and (3) output control signals and control data to the multi-path controller 8 in the graphic processor 2 to thereby control the draw processing of the graphic processor 2 using the geometry data transferred to the multi-path buffer 7.

Internal Constitution of Graphic Processor

The graphic processor 2 is a processor device capable of executing various processing including calculation, and comprises the multi-path buffer 7, the multi-path controller 8, a texture buffer 9, a rendering engine 10, a frame buffer 11, a Z merge accumulation engine 12 and an accumulation buffer 13.

The multi-path buffer 7 comprises a plurality of register memories capable of storing data in a digital form, and in the register memories various data necessary for the draw processing, such as geometry data transferred from the main processor 1, are buffered. For the case that multi-texture drawing is executed, the multi-path buffer 7 stores the parameter table transferred from the control section 6.

The multi-path controller 8 serially reads the geometry data used for the draw processing out from the multi-path buffer 7 according to a control command output from the main processor 1, and outputs it to the rendering engine 10. The multi-path controller 8 also carries out data conversion of geometry data according to control command and control data output from the main processor 1, and controls operations of the texture buffer 9 and Z merge accumulation engine 12.

The multi-path controller 8 has a multiplying section 15 responsible for scaling of texture coordinates. The multiplying section 15 multiplies the texture coordinate data read out from the multi-path buffer 7 by a coefficient according to control command and control data output from the main processor 1. For an exemplary case in which texture coordinates differing in the magnification factor are used in different rendering paths, the multiplying section 15 varies the magnification factor through multiplying the texture coordinate by a coefficient and outputs the result to the rendering engine 10, so that it is no more necessary for the main processor 1 to generate texture coordinate data having different magnification factors nor to buffer them in the multi-path buffer 7. This desirably suppresses the process load for the main processor 1 and saves a memory capacity of the multi-path buffer 7.

For the case the multi-texture drawing (detailed later) is carried out, the multi-path controller 8 reads the parameter table out from the multi-path buffer 7, and then outputs, referring to the parameter table, information related to base points and blending ratios of textures used for the multi-texture drawing together with the geometry data to the rendering engine 10.

The texture buffer 9 stores a plurality of texture data for use in pasting on polygons to be drawn, and other data such as CLUT (Color Look Up Table) having recorded therein color information of color-subtracted textures.

The rendering engine 10 converts the geometry data output from the multi-path buffer 7 into pixel information. More specifically, the rendering engine 10 calculates a coordinate value, Z value, texture coordinate and brightness value corresponded to the individual pixels in the two-dimensional screen (collectively referred to as "pixel information" hereinafter) using the geometry data output from the multi-path buffer 7. The rendering engine 10 also controls reading of textures from the texture buffer 9 and writing of pixel information into the frame buffer 11.

The rendering engine 10 shifts base points of texture data read out from the texture buffer 9 while being instructed by the multi-path controller 8. This successfully allows the rendering engine 10 to carry out linear conversion of the individual axes of the texture coordinates in cooperation with the scaling function of the multi-path controller 8 using the multiplying section 15. The rendering engine 10 also has a function of selectively replacing the brightness value (R,G,B,A) contained in the geometry data output from the multi-path buffer 7 with a fixed value.

The rendering engine 10 executes multi-texture drawing, which is a process of concomitantly reading a plurality of textures and subjecting them to blend drawing, using the geometry data output from the multi-path buffer 7 and information related to base points and blending ratios of textures used for multi-texture drawing.

The rendering engine 10 is still also responsible for scissoring, dithering, color clamping, and if the occasion demands, testing. Scissoring refers to a processing for removing a portion of data overflowed from the screen. Dithering refers to a processing for combining the color arrangement in order to express a wide variety of colors with a small number of source colors. Color clamping refers to a processing for limiting color value during calculation of colors so as not to exceed 255 or fall below 0. Testing refers to a processing for determining whether the drawing is executed or not according to a coefficient which expresses a blending ratio of images during texture mapping.

Data generated by the rendering engine 10 through the foregoing processing is written in the frame buffer 11 so as to produce a frame data (two-dimensional image data) corresponded to the three-dimensional image to be drawn on the two-dimensional screen. Thus generated frame data is then read out from the frame buffer 11 and output to a display section 14.

The Z merge accumulation engine 12 synthesizes a plurality of frame data written in the frame buffer 11 by overwriting them and calculating a weighted average thereof, and outputs thus synthesized frame data to an accumulation buffer 13. The accumulation buffer 13 stores the synthesized frame data, and the synthesized data is written back to the frame buffer 2.

As described in the above, the graphic processor 2 executes, according to control signals and control data output from the control section 6 in the main processor 1, draw processing by serially reading the geometry data and various parameters which have been transferred from the main processor 1 to the multi-path buffer 7, to thereby draw a specified three-dimensional image on the display section 14.

Multi-Path Rendering

A process flow according to which the draw processing device executes multi-path rendering will be explained referring to a flow chart shown in FIG. 2. The flow chart shown in FIG. 2 represents a process flow for the case that the multi-path rendering comprises three rendering paths of (1) a draw processing for drawing a base polygon, (2) a draw processing for pasting a base texture to the base polygon, and (3) a draw processing for pasting a detailed texture on the base texture.

Figure 2:
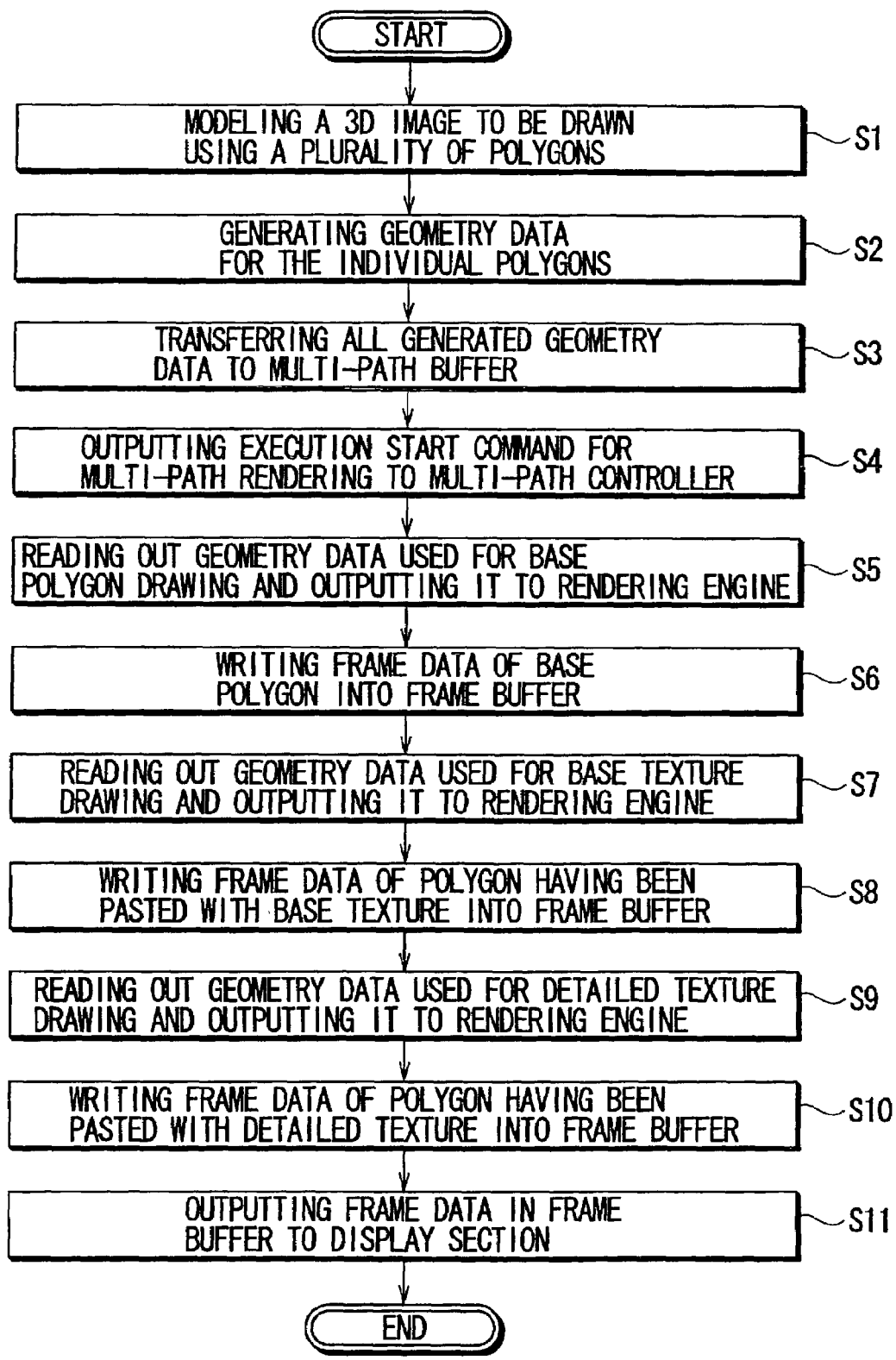
FIG. 2 is a flow chart of a multi-path rendering according to an embodiment of the present invention.
Figure 5:
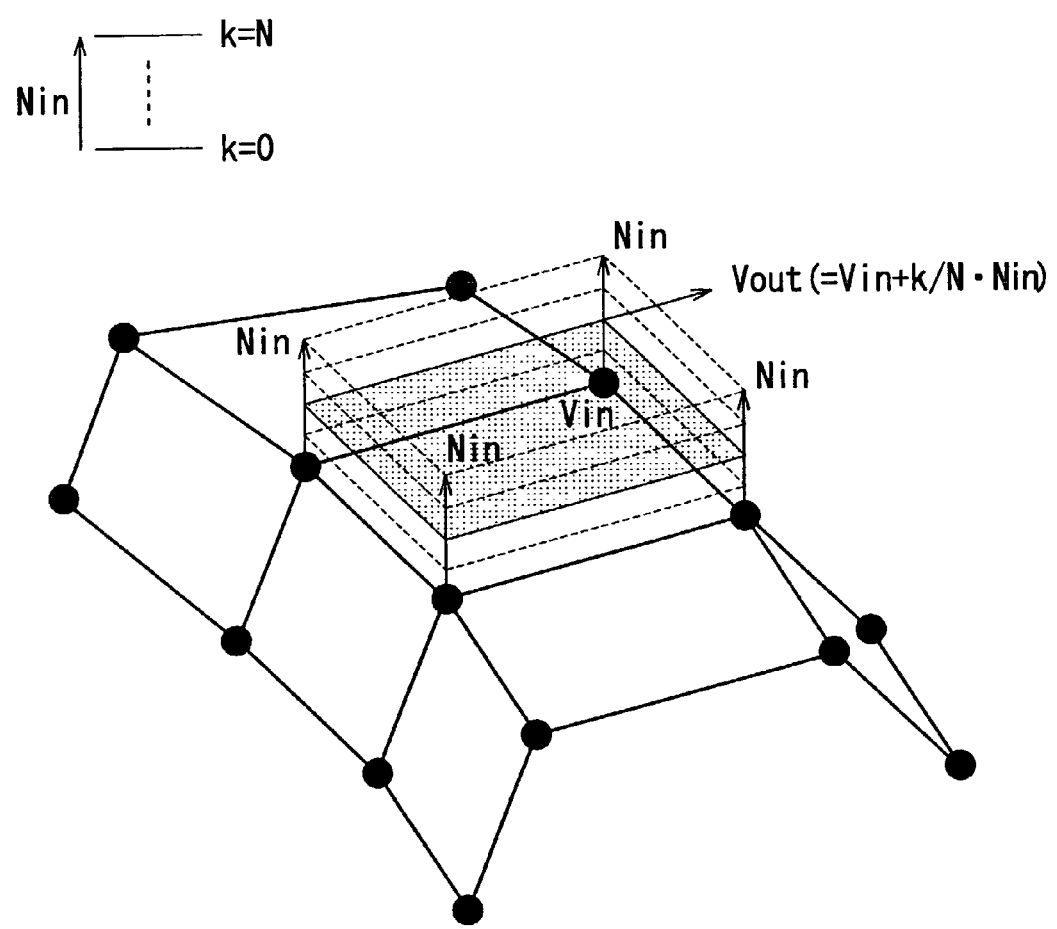
FIG. 5 is a schematic drawing for explaining a multi-texture drawing according to an embodiment of the present invention.

The flow chart shown in FIG. 2 starts when the control section 6 outputs an execution start command for the multi-path rendering to the modeling section 4, upon which the multi-path rendering advances to a process of step S1.

In step S1, the modeling section 4 models a three-dimensional image to be drawn on a two-dimensional screen using a plurality of polygons, and outputs polygon information for the generated polygons to the geometry processing section 5. Step S1 thus comes to the end, and the multi-path rendering advances to step S2.

In step S2, the geometry processing section 5 executes geometry processing using the polygon information output from the modeling section 4, to thereby generate geometry data. Step S2 thus comes to the end, and the multi-path rendering advances to step S3.

The geometry processing section 5 in step S2 collectively calculates apex coordinate data (X,Y,Z) for the polygons, texture coordinate data (S1,T1,Q1) for the base texture, texture coordinate data (S2,T2,Q2) for the detailed texture, and brightness data (R,G,B,A) for every rendering path, to thereby produce the geometry data for all rendering paths composing the multi-path rendering.

In most cases for the ordinary multi-path rendering, the apex coordinate value, for example, is provided in common for a plurality of rendering paths since the same polygon is drawn again and again. For such case, the process is preferably designed so that the geometry processing section 5 does not repeatedly calculate data commonly used in different rendering paths, but calculate only the geometry data which varies from path to path (e.g., texture coordinate data and brightness data).

In step S3, the control section 6 transfers the geometry data generated by the geometry processing section 5 to multi-path buffer 7, and the multi-path buffer 7 buffers the transferred geometry data. Step S3 thus comes to the end, and the multi-path rendering advances to step S4.

The geometry data transferred to the multi-path buffer 7 in step S3 is buffered therein typically according to a data arrangement shown in FIG. 3. FIG. 3 shows an exemplary data arrangement for the geometry data for the case that a draw primitive is an independent triangle.

As is clear from the drawing, in this data arrangement, data related to a single triangular polygon, which include the apex coordinate data (X,Y,Z), texture coordinate data (S1,T1,Q1) for the base texture, texture coordinate data (S2,T2,Q2) for the detailed texture and brightness data (R,G,B,A), are buffered in the first, second, third and fourth register memories, respectively, of the multi-path buffer 7. Also the fifth through eighth register memories, and the ninth through twelfth register memories of the multi-path buffer 7 respectively contain geometry data of other triangular polygons with the same arrangement. At the end of the data block of the geometry data, which corresponds to the thirteenth register memory of the multi-path buffer 7 in this data arrangement, a draw kick command (DRAW) is buffered so as to instruct the rendering engine 10 to start the rendering using the geometry data stored in the first through twelfth register memories.

According to the data arrangement shown in FIG. 3, the geometry data are stored in the multi-path buffer 7 while being grouped by polygons. Reading-out of a data block, which comprises the apex coordinate data, specified texture coordinate data (i.e., texture coordinate data for the base texture or detailed texture) and brightness data, by the multi-path controller 8 can thus activate rendering of a polygon specified by thus read coordinate values.

It should be noted that the data arrangement shown in FIG. 3 is merely one example of the multi-path rendering targeted at a triangular polygon, and of course the data arrangement can properly be modified depending on the shape of the draw primitive.

In step S4, the control section 6 outputs the execution start command for the multi-path rendering to the multi-path controller 8. Step S4 thus comes to the end, and the multi-path rendering advances to step S5.

In step S5, the multi-path controller 8 reads the geometry data used for the base polygon drawing out from the multi-path buffer 7 according to the execution start command which has been output from the control section 6, and outputs thus read-out geometry data to the rendering engine 10. Step S5 thus comes to the end, and the multi-path rendering advances to step S6.

In the base polygon drawing in step S5, the multi-path controller 8 reads the apex coordinate data (X,Y,Z) buffered in the multi-path buffer 7 (geometry data stored in the 1st, 5th and 9th register memories in FIG. 3), and outputs them to the rendering engine 10.

In step S6, the rendering engine 10 writes the frame data of the base polygon into the frame buffer 11 using the apex coordinate data (X,Y,Z) received from the multi-path buffer 7. Step S6 thus comes to the end, and the multi-path rendering advances to step S7.

In step S7, the multi-path controller 8 reads the geometry data used for the base texture drawing from the multi-path buffer 7, and outputs thus read geometry data to the rendering engine 10. Step S7 thus comes to the end, and the multi-path rendering advances to step S8.

In the base texture drawing in step S7, the multi-path controller 8 reads the apex coordinate data (X,Y,Z) of the polygon, texture coordinate data (S1,T1,Q1) for the base texture to be pasted on the polygon, and brightness data (R,G,B,A) from the multi-path buffer 7 (i.e., geometry data stored in the 1st, 2nd, 4th, 5th, 6th, 8th, 9th, 10th and 12th register memories in FIG. 3), and outputs them to the rendering engine 10.

In step S8, the rendering engine 10 writes the frame data of the polygon having already been pasted with the base texture into the frame buffer 11 using the apex coordinate data (X,Y,Z), texture coordinate data (S1,T1,Q1) for the base texture and brightness data (R,G,B,A), all of which received from the multi-path buffer 7. Step S8 thus comes to the end, and the multi-path rendering advances to step S9.

In step S9, the multi-path controller 8 reads the geometry data used for the detailed texture drawing from the multi-path buffer 7, and outputs thus read geometry data to the rendering engine 10. Step S9 thus comes to the end, and the multi-path rendering advances to step S10.

In the detailed texture drawing in step S9, the multi-path controller 8 reads the apex coordinate data (X,Y,Z) of the polygon, texture coordinate data (S2,T2,Q2) for the detailed texture to be pasted on the polygon, and brightness data (R,G,B,A) (i.e., geometry data stored in the 1st, 3rd, 4th, 5th, 7th, 8th, 9th, 11th and 12th register memories in FIG. 3) out from the multi-path buffer 7, and outputs them to the rendering engine 10.

In most cases for the ordinary multi-path rendering, the brightness data (R,G,B,A) is provided as a fixed value for the second rendering path and thereafter. For the case that the brightness data is fixed, the process is preferably designed so that the multi-path controller 8 does not re-send to the rendering engine 10 the same brightness data (R,G,B,A) as in the second rendering path, but instead, the rendering engine 10 selectively replaces the brightness data (R,G,B,A) with a fixed value while being instructed by the multi-path controller 8.

For the case the texture drawing includes scaling of the texture, the control section 6 specifies a coefficient to be multiplied to the texture coordinate and the shifting amount of the base point of the texture for the multi-path controller 8. When the control section 6 specifies the coefficient, the multi-path controller 8 controls the multiplying section 15 to thereby multiply the texture coordinate read out from the multi-path buffer 7 with the specified coefficient, and outputs it to the rendering engine 10. When the control section 6 specifies the shifting amount of the base point of the texture, the rendering engine 10 shifts the S axis and T axis of the texture coordinate by an amount specified by the shifting amount.

In step S10, the rendering engine 10 writes the frame data of the polygon having already been pasted with the detailed texture into the frame buffer 11 using the geometry data received from the multi-path buffer 7. Step S10 thus comes to the end, and the multi-path rendering advances to step S11.

In step S11, the display section 14 reads the frame data written in the frame buffer 11, and outputs for display a three-dimensional image thus processed by multi-path rendering. Step S11 thus comes to the end, and thus the multi-path rendering also completes.

As described in the above, in the multi-path rendering using the foregoing draw processing device, the geometry data used for the second rendering path and thereafter is stored in the multi-path buffer 7, and the multi-path controller 8 reads necessary geometry data out from the multi-path buffer 7 while being instructed by the control section 6. Therefore it is no more necessary for the main processor 1 to produce the geometry data nor then send it to the graphic processor 2 each time the rendering path is executed.

Multi-Texture Drawing

A process flow according to which the draw processing device executes multi-texture drawing will be explained referring to a flow chart shown in FIG. 4.

It should be noted that the multi-texture drawing described herein means a processing by which (N+1) polygon planes which differ in the blending ratio of two texture data are drawn after being synthesized based on weighted average in the direction of a displacement vector $N_{in}$ of the polygon. In this case, an apex coordinate vector $V_{out}$ for the k-th (k=0 to N) polygon plane can be expressed as $V_{out}=V_{in}+(k/N) \cdot N_{in}$ using an apex coordinate vector $V_{in}$. According to the multi-texture drawing, various effects such as quasi-three-dimensional drawing effect, motion blurring effect and defocusing effect can be obtained by synthesizing and drawing a plurality of polygons, which differ in the blending ratios of two textures, along the displacement vector $N_{in}$.

The flow chart shown in FIG. 4 starts when the control section 6 outputs an execution start command for the multi-texture drawing to the modeling section 4, upon which the multi-texture drawing advances to a process of step S21.

In step S21, the modeling section 4 models a three-dimensional image to be drawn on a two-dimensional screen using a plurality of polygons, and outputs polygon information for the generated polygons to the geometry processing section 5. Step S21 thus comes to the end, and the multi-texture drawing advances to step S22.

In step S22, the geometry processing section 5 executes geometry processing using thus generated polygon information to thereby generate geometry data. Step S22 thus comes to the end, and the multi-texture drawing advances to step S23.

In the execution of the multi-texture drawing herein, the geometry processing section 5 calculates geometry data which include apex coordinate vector data $V_{in}$ for the individual apex of the polygon, texture coordinate data (S1,T1,Q1), (S2,T2,Q2) for the textures used for blend drawing at the individual apexes, brightness data (R,G,B,A) and the displacement vector data $N_{in}$.

In step S23, the control section 6 transfers the geometry data generated by the geometry processing section 5, and a parameter table having recorded therein base points and blending ratios of the textures used in the blend drawing to the multi-path controller 8. Step S23 thus comes to the end, and the process advances to step S24.

The parameter table typically has a data arrangement shown in FIG. 6, where the base points and blending ratios for the textures used in blend drawing for the individual polygon planes (multi-path number) "k" are described. FIG. 6 shows an exemplary data form in which each of five polygon planes expressed by number "k" of 0 to 4 has base points of two textures, and a blending ratio of the two textures.

In step S24, the control section 6 outputs the execution start command for the multi-texture drawing to the multi-path controller 8. Step S24 thus comes to the end, and the multi-texture drawing advances to step S25.

In step S25, the multi-path controller 8 resets the value "k" of a counter for counting the polygon planes (multi-path number) to zero (k=0). Step S25 thus comes to the end, and the multi-texture drawing advances to step S26.

In step S26, the multi-path controller 8 reads the apex coordinate vector data $V_{in}$ and displacement vector $N_{in}$ out from the multi-path buffer 7, and calculates the apex coordinate vector $V_{out}$ (=$V_{in}$+(k/N)·$N_{in}$) for polygon plane (multi-pas number) "k" using the apex coordinate vector data $V_{in}$ and displacement vector $N_{in}$. The multi-path controller 8 then outputs thus calculated apex coordinate vector $V_{out}$ to the rendering engine 10. Step S26 thus comes to the end, and the multi-texture drawing advances to step S27.

It is also preferable to allow the multi-path controller 8 to generate random numbers to thereby vary the size of the displacement vector $N_{in}$. According to the constitution, the individual polygon planes k are drawn so that the jaggy on the edge thereof are drawn on positions slightly shifted from each other, which successfully realizes so-called anti-aliasing, which is a process for removing or preventing alias, when a plurality of polygon planes are synthesized.

In step S27, the rendering engine 10 writes the frame data of the polygon into the frame buffer 11 using the apex coordinate vector $V_{out}$ which has been transferred from the multi-path buffer 7. Step S27 thus comes to the end, and the multi-texture drawing advances to step S28.

In step S28, the multi-path controller 8 extracts the base point value and blending ratio of the texture on the polygon plane (multi-path number) k, and outputs thus extracted base point value and blending ratio to the rendering engine 10 together with the apex coordinate vector $V_{out}$, texture coordinate values (S1,T1,Q1), (S2,T2,Q2), and brightness data (R,G,B,A). Step S28 thus comes to the end, and the multi-texture drawing advances to step S29.

In step S29, the rendering engine 10 writes the frame data corresponded to the polygon plane k on which two texture were pasted by the blend drawing into the frame buffer 11 using the apex coordinate vector $V_{out}$, texture coordinate values (S1,T1,Q1), (S2,T2,Q2), and brightness data (R,G,B,A) transferred from the multi-path buffer 7. Step S29 thus comes to the end, and the multi-texture drawing advances to step S30.

In step S30, the multi-path controller 8 discriminates whether the value k of the counter is equal to N (a value for the end point of the displacement vector) or not. If the value k of the counter is not equal to N, the multi-texture drawing advances to step S31.

In step S31, the multi-path controller 8 increments the value k of the counter by 1. Step S31 thus comes to the end, and the multi-texture drawing goes back to step S26.

On the contrary, if the value k of the counter is equal to N, the multi-texture drawing advances from step S30 to step S32.

In step S32, the Z merge accumulation engine 12 reads the frame data corresponded to the polygon planes k=0 to N written in the frame buffer 11, and synthesizes the frame data corresponded to the polygon planes k=0 to N by finding a weighted average of the frame data. The Z merge accumulation engine 12 then outputs thus synthesized frame data to the accumulation buffer 13. Step S32 thus comes to the end, and the multi-texture drawing advances to step S33.

In step S33, the accumulation buffer 13 writes the synthesized frame data back in the frame buffer 11, and the display section 14 outputs the frame data written back into the frame buffer 11. Step S33 thus comes to the end, which completes a series of multi-texture drawing.

In one preferable mode of synthesis of the frame data, the rendering engine 10 performs sampling a 12-bit texture into 8-bit, and that the Z merge accumulation engine 12 overwrites the texture with a 16-bit accuracy. This considerably raises accuracy in the pixel calculation. Sampling of a 12-bit texture into 8-bit can preferably be carried out by typically using a numerical formula of $T_{out}$=($T_{in}$+k)>>4 (where $T_{out}$ and $T_{in}$ represent texture output and texture input, respectively).

As described in the above, in the multi-texture drawing using the foregoing draw processing device, geometry data used for drawing of the individual polygon plane k, and draw parameters such as the base point value and blending ratio of the texture are stored in the multi-path buffer 7, and the multi-path controller 8 serially reads necessary geometry data and draw parameters out from the multi-path buffer 7 to thereby effect drawing. Therefore it is no more necessary for the main processor 1 to produce the geometry data nor then send it to the graphic processor 2 each time the path is executed.

As is clear from the above description, in the draw processing device of the present invention, the geometry processing section 5 collectively generates draw data (geometry data, draw parameters) for use in the multi-path rendering or multi-texture drawing, and the control section 6 transfers thus calculated draw data to the multi-path buffer 7 in the graphic processor 2. When the multi-path rendering or multi-texture drawing is executed, the multi-path controller 8 serially reads the draw data stored in the multi-path buffer 7 according to control command and control data received from the control section 6, and outputs them to the rendering engine 10.

According to the constitution, the main processor 1 does not produce nor re-transfer the draw data during the multi-path rendering or multi-texture drawing, which considerably reduces the number of times the main processor 1 transfers the geometry data to the graphic processor 2, and thus desirably saves the band width necessary for transfer of the draw data from the main processor 1 to the graphic processor 2. Since the geometry processing section 5 collectively generates all draw data for use in the multi-path rendering and multi-texture drawing, and only the control section 6 operates during the multi-path rendering and multi-texture drawing so as to control the draw processing of the graphic processor 2 using control command and control data, which is beneficial in that reducing the load of the main processor and the entire portion of the draw processing device.

In the foregoing draw processing device, the multiplying section 15 in the multi-path controller 8 multiplies a texture coordinate value read out from the multi-path buffer 7 by a coefficient output from the control section 6. Under the constitution, it is no more necessary for the main processor 1 to generate various texture coordinate data having different magnification factors, nor to buffer them in the multi-path buffer 7, which desirably suppresses the process load for the main processor 1 and saves a memory capacity of the multi-path buffer 7.

In the foregoing draw processing device, the rendering engine 10 shifts the origin of texture while being instructed by the multi-path controller 8. The constitution also allows the rendering engine 10 to carry out linear conversion of the individual axes of the texture coordinates on the graphic processor 2 in cooperation with a function of the multiplying section 15, which further reduces the process load of the main processor 1.

In the foregoing draw processing device, the rendering engine 10 replaces, as occasion demands, the brightness value (R,G,B,A) in the geometry data with a fixed value while being instructed by the multi-path controller 8, so that it is no more necessary for the multi-path controller 8 to re-send the same brightness data (R,G,B,A) again and again, which is successful in raising the drawing speed of the rendering engine 10.

While the foregoing paragraphs dealt with the embodiments to which the invention proposed by the present inventors was applied, the present invention is by no means limited by the above description and drawings which compose part of the disclosure of the present invention through the embodiments. It is therefore to be understood that any other embodiments, examples and practicing techniques possibly accomplished by those skill in the art are included in the scope of the present invention.

What is claimed is:

1. A draw processing device comprising:
   a draw data generator that generates draw data for use in draw processing composed of a plurality of rendering passes; and
   a control section that transfers the generated draw data through bus wiring and controlling the draw processing using the draw data; and
   a multi-pass buffer that buffers the draw data transferred by the control section through the bus wiring;
   a multi-pass controller that serially reads the draw data for use in individual rendering passes that comprise the draw processing out from the multi-pass buffer under control of the control section; and
   a draw processing section that effects the draw processing by executing the individual rendering passes using the draw data read by the multi-pass controller;
   wherein the draw data is geometry data containing at least coordinate values for apexes of polygons composing an image to be drawn, and texture coordinate values and brightness values for the apexes.

2. The draw processing device according to claim 1, wherein the multi-pass controller multiplies the texture coordinate value read out from the multi-pass buffer by a coefficient specified by the control section under control of the control section.

3. The draw processing device according to claim 1, wherein the draw processing section shifts an origin for referencing the texture coordinate values under control of the control section.

4. The draw processing device according to claim 1, wherein the draw processing section replaces the brightness value with a fixed value under control of the control section.

5. The draw processing device according to claim 1, wherein
   the control section transfers a parameter table having draw parameters used for blend drawing of a plurality of texture data on the polygon to the multi-pass buffer together with the geometry data;
   the multi-pass buffer buffers the geometry data and the parameter table transferred through the bus wiring;
   the multi-pass controller refers to the parameter table to thereby read the draw parameters and the geometry data out into the draw processing section; and
   the draw processing section executes the blend drawing using the readout geometry data and draw parameters.

6. The draw processing device according to claim 5, wherein the draw parameters are a base-point value and a blending coefficient of a texture used in the blend drawing.

7. A drawing method comprising the steps of:
   generating draw data for use in draw processing composed of a plurality of rendering paths;
   transferring the generated draw data through a bus wiring;
   buffering the draw data transferred through the bus wiring;
   serially reading data for use in individual rendering passes that comprise the draw processing out from the buffered draw data; and
   executing the individual rendering passes using the readout draw data;
   wherein the draw data is geometry data containing at least coordinate values for apexes of polygons composing an image to be drawn and texture coordinate values and brightness values for the apexes.

8. The drawing method according to claim 7, further comprising the step of multiplying the texture coordinate value read out from the buffered geometry data by a specified coefficient.

9. The drawing method according to claim 7, further comprising the step of shifting an origin for referencing the texture coordinate values after serially reading data.

10. The drawing method according to claim 7, further comprising the step of replacing the brightness value read out from the buffered geometry data with a fixed value.

11. The drawing method according to claim 7, further comprising the steps of:
    transferring a parameter table having draw parameters used for blend drawing of a plurality of texture data on the polygon through a bus wiring;
    buffering the parameter table transferred through the bus wiring; and
    referring to the parameter table to thereby read out the draw parameters,
    wherein the blend drawing is executed in the executing step using the readout geometry data and draw parameters.

12. The drawing method according to claim 11, wherein the draw parameters are a base-point value and a blending coefficient of a texture used in the blend drawing.

13. A draw program to be executed by a computer, comprising the process steps of:
    generating draw data for use in draw processing composed of a plurality of rendering passes;
    transferring the generated draw data through a bus wiring;
    buffering the draw data transferred through the bus wiring;

serially reading data for use in individual rendering passes that comprise the draw processing out from the buffered draw data; and executing the individual rendering passes using the readout draw data;

wherein the draw data is geometry data containing at least coordinate values for apexes of polygons composing an image to be drawn, and texture coordinate values and brightness values for the apexes.

14. A computer-readable recording medium having recorded therein a draw program to be executed by a computer, wherein the draw program comprises the process steps of:

generating draw data for use in draw processing composed of a plurality of rendering passes;

transferring the generated draw data through a bus wiring;

buffering the draw data transferred through the bus wiring;

serially reading data for use in individual rendering passes that comprise the draw processing out from the buffered draw data; and executing the individual rendering passes using the readout draw data;

wherein the draw data is geometry data containing at least coordinate values for apexes of polygons composing an image to be drawn, and texture coordinate values and brightness values for the apexes.

15. The computer-readable recording medium according to claim 14, wherein the draw program further comprises the step of multiplying the texture coordinate value read out from the buffered geometry data by a specified coefficient.

16. The computer-readable recording medium according to claim 14, wherein the draw program further comprises the step of shifting an origin for referencing the texture coordinate values after serially reading data.

17. The computer-readable recording medium according to claim 14, wherein the draw program further comprises the step of replacing the brightness value read out from the buffered geometry data with a fixed value.

18. The computer-readable recording medium according to claim 14, wherein the draw program further comprises the process steps of:

transferring a parameter table having draw parameters used for blend drawing of a plurality of texture data on the polygon through a bus wiring;

buffering the parameter table transferred through the bus wiring; and referring to the parameter table to thereby read out the draw parameters, wherein the blend drawing is executed in the executing step using the readout geometry data and draw parameters.

19. The computer-readable recording medium according to claim 18, wherein the draw parameters are a base-point value and a blending coefficient of a texture used in the blend drawing.

20. A graphical processor (GPU) comprising:

a multi-pass buffer that buffers draw data prepared by a main processor (CPU) and transferred by a control section of the CPU through bus wiring interconnecting the GPU and CPU;

a multi-pass controller that serially reads the draw data for use in individual rendering passes that comprise the draw processing out from the multi-pass buffer under control of the control section; and a draw processing section that effects the draw processing by executing the individual rendering passes using the draw data read by the multi-pass controller;

wherein the draw data is geometry data containing at least coordinate values for apexes of polygons composing an image to be drawn, and texture coordinate values and brightness values for the apexes.

* * * * *